(12) United States Patent
Ayalasomayajula

(10) Patent No.: US 10,270,933 B2
(45) Date of Patent: Apr. 23, 2019

(54) MULTI-CAMERA SYSTEM CONTENT CAPTURE AND MANAGEMENT

(71) Applicant: GoPro, Inc., San Mateo, CA (US)

(72) Inventor: Shishir Rao Ayalasomayajula, Cupertino, CA (US)

(73) Assignee: GOPRO, INC., San Mateo, CA (US)

( * ) Notice: Subject to any disclaimer, the term of this patent is extended or adjusted under 35 U.S.C. 154(b) by 536 days.

(21) Appl. No.: 15/071,199

(22) Filed: Mar. 15, 2016

(65) Prior Publication Data

US 2017/0272600 A1 Sep. 21, 2017

(51) Int. Cl.
*H04N 1/21* (2006.01)
*H04N 5/247* (2006.01)
*H04N 1/00* (2006.01)

(52) U.S. Cl.
CPC ....... *H04N 1/2133* (2013.01); *H04N 1/00251* (2013.01); *H04N 1/212* (2013.01); *H04N 5/247* (2013.01); *H04N 2201/0031* (2013.01); *H04N 2201/0032* (2013.01); *H04N 2201/0039* (2013.01); *H04N 2201/0074* (2013.01); *H04N 2201/0084* (2013.01)

(58) Field of Classification Search
CPC .. H04N 1/2133; H04N 1/00251; H04N 1/212; H04N 5/247; H04N 2201/0031; H04N 2201/0032; H04N 2201/0039; H04N 2201/0074; H04N 2201/0084
See application file for complete search history.

(56) References Cited

U.S. PATENT DOCUMENTS

| | | | | |
|---|---|---|---|---|
| 5,899,581 | A * | 5/1999 | Kawamura | H04N 1/2112 348/220.1 |
| 7,755,661 | B2 * | 7/2010 | Aizawa | H04N 1/00204 348/207.1 |
| 8,411,152 | B2 * | 4/2013 | Kaibara | G06F 17/30244 348/207.99 |
| 2004/0263644 | A1 * | 12/2004 | Ebi | G06F 17/3028 348/231.2 |
| 2005/0108291 | A1 * | 5/2005 | Watanabe | H04N 1/00204 |
| 2005/0165795 | A1 * | 7/2005 | Myka | G06Q 10/1095 |
| 2005/0246496 | A1 * | 11/2005 | Nagata | G06F 17/30988 711/117 |
| 2005/0278618 | A1 * | 12/2005 | Ogikubo | G11B 27/034 715/255 |

(Continued)

*Primary Examiner* — Antoinette T Spinks
(74) *Attorney, Agent, or Firm* — Gazdzinski & Associates, PC

(57) ABSTRACT

Synchronization of simultaneously captured media in a multi-camera system is performed using a consistent file structure within the cameras. A primary camera receives a bitmap describing the file and folder utilization of each of one or more secondary cameras. The primary camera selects a folder number and file position number that is commonly available across all cameras. The primary camera directs the secondary cameras to store subsequently simultaneously captured media content at the selected file number and folder position number. During post-processing, simultaneously-captured content is accessed based on common folder numbers and file position numbers. A post-processing system compares a timestamp associated with each content file in a group with matching folder numbers and file position numbers to identify false positive groupings.

19 Claims, 6 Drawing Sheets

(56) References Cited

U.S. PATENT DOCUMENTS

| | | | | |
|---|---|---|---|---|
| 2010/0281073 | A1* | 11/2010 | Cloutier | G06F 17/3028 707/809 |
| 2011/0137916 | A1* | 6/2011 | Deen | G06F 17/3002 707/747 |
| 2011/0313972 | A1* | 12/2011 | Albouze | G06F 17/30174 707/624 |
| 2014/0184822 | A1* | 7/2014 | Aikawa | H04N 1/00103 348/207.1 |

* cited by examiner

| Example # | Primary Capture Device 102a | | | Secondary Capture Device 102b | | | Output | |
|---|---|---|---|---|---|---|---|---|
| | Highest folder # | Highest file # | file count in highest folder | Highest folder # | Highest file # | file count in highest folder | Selected folder # | Selected file position # |
| 1 | 109 | 0990 | 500 | 109 | 0445 | 200 | 109 | 0991 |
| 2 | 100 | 1000 | 100 | 102 | 0002 | 2 | 102 | 0003 |
| 3 | 102 | 9999 | 10 | 102 | 0005 | 5 | 103 | 0001 |
| 4 | 100 | 0100 | 100 | 999 | 9990 | 999 | 101 | 0001 |

FIG. 4

MULTI-CAMERA SYSTEM CONTENT CAPTURE AND MANAGEMENT

FIELD OF ART

This application relates generally to file system management, and more specifically to managing the synchronization of related files across multiple cameras.

BACKGROUND

Multi-camera systems allow for simultaneous capture of content from different viewpoints. In environments in which multiple cameras or capture devices are operating simultaneously, image stills or video clips recorded at the same may be combined (for instance by a post-processing system) to produce an immersive image/video experience. Globally unique media identifiers (GUMIs) uniquely identify individual image or video content and may be used to associate simultaneously-captured images/video. However, a post-processing system must physically access the media storage of each individual capture device in order to reconcile simultaneous captures. Synchronization information must be stored in such a way as to remain associated with content files independent of the storage medium used to store the content files.

SUMMARY

A file synchronization mechanism in a multi-camera system ensures the coordination of images/videos simultaneously-captured by the multi-camera system. Each capture device (such as a digital camera, smartphone device, etc.) captures content. Content can include images, videos, audio, and the like. Capture devices store content according to the DCF (Design Rule for Camera File System) or any other suitable file convention. In one embodiment, file synchronization is implemented by a single capture device, configured to act as a primary or master capture device in relation to multiple secondary or slave capture devices.

Within a set of capture devices, a primary capture device requests or accesses a folder bitmap from each of the secondary capture devices. The bitmap conveys information about the folder and file structure in a content storage (such as an SD card) of each secondary capture device. Based on the received bitmaps, the primary capture device determines the highest folder number across all capture devices (including itself). The primary capture device then determines, for each capture device in the set of capture devices with a folder corresponding to the highest folder number, the highest file position number within the set of folders corresponding to the highest folder number. The primary capture device determines if the folder containing a file corresponding to the highest file position can accommodate an additional file. If so, the primary capture device selects a file position number greater than the determined highest file position number (for instance, the highest file position number incremented by one), and determines if the other secondary capture devices can store a content file corresponding to the selected file position number in a folder corresponding to the determined highest folder number. If not, the primary capture device identifies and resolves folder/file conflicts across the secondary capture devices. The primary capture device provides a selected highest folder number and the selected file position number to each capture device in the set of capture devices for using in storing subsequently and simultaneously captured media.

A post-processing system, or a capture device itself, accesses or retrieves media content files captured by one or more other capture devices. The post-processing system groups accessed media content files with a common folder number and file position number corresponding to the media content (each of which are encoded into the folder and file name of each media content file in accordance with the DCF file naming convention). The post-processing system compares timestamps of files within the grouped media content to determine if the media content files were in fact captured simultaneously. Media content file groups determined to be captured non-simultaneously (for instance as a result of widely varying timestamps) are discarded as false-positives.

In one aspect of the present disclosure, a multi-camera system is disclosed. In one embodiment, the multi-camera system includes: one or more secondary cameras; and a master camera configured to: receive, from each of the one or more secondary cameras, a bitmap describing a file and folder structure of the respective secondary camera; select a folder number based on a highest-numbered folder identified by the received bitmaps; identify a highest file position number within the highest-numbered folder using the received bitmaps; determine if the highest-numbered folder can accommodate an additional content file; select a file position number, the selected file position number including the identified highest file position number incremented by one, in response to a determination that the highest-numbered folder can accommodate the additional content file; in response to a determination that the highest-numbered folder cannot accommodate the additional content file: determine that a number of the highest-numbered folder is less than a number of a maximum-numbered folder; select the folder number by incrementing the number of the highest-numbered folder; and select an initial file position number as the selected file position number; in response to a determination that the highest-numbered folder is the maximum-numbered folder: select, based on the received bitmaps, a lower folder number available to each of the master camera and the secondary cameras; and select the initial file position number as the selected file position number; and transmit, to each of the secondary cameras, (i) the selected folder number or the selected lower folder number and (ii) the selected file position number.

In another aspect of the present disclosure, a method for content synchronization in a multi-camera system is disclosed. In one embodiment, the method includes: receiving, by a master camera from each of a plurality of secondary cameras, a bitmap describing a file and folder structure of the respective secondary camera; selecting, by the master camera, a folder number based on a highest-numbered folder identified by the received bitmaps; identifying, by the master camera, a highest file position number within the highest-numbered folder using the received bitmaps; determining, by the master camera, if the highest-numbered folder can accommodate an additional content file; selecting, by the master camera, a file position number, the selected file position number including the identified highest file position number incremented by one, in response to a determination that the highest-numbered folder can accommodate the additional content file; in response to a determination that the highest-numbered folder cannot accommodate the additional content file: determining, by the master camera, that a number of the highest-numbered folder is less than a number of a maximum-numbered folder; selecting, by the master camera, the folder number by incrementing the number of the highest-numbered folder; and selecting, by the master camera, an initial file position number as the selected file position number; in response to a determination that the highest-numbered folder is the maximum-numbered folder: selecting, by the master camera and based on the received bitmaps, a lower folder number available to each of the master camera and the secondary cameras; and selecting, by the master camera, an initial file position number as the selected file position number; and transmitting, by the master camera to each of the secondary cameras, (i) the selected folder number or the selected lower folder number and (ii) the selected file position number.

In another aspect of the present disclosure, a computer-readable apparatus is disclosed. In one embodiment, the computer-readable apparatus includes a storage medium storing executable instructions for content synchronization in a multi-camera system, the instructions, when executed by a hardware processor apparatus, being configured to cause a master camera to: receive, from each of a plurality of secondary cameras, a bitmap describing a file and folder structure of the respective secondary camera; select a folder number based on a highest-numbered folder identified by the received bitmaps; identify a highest file position number within the highest-numbered folder using the received bitmaps; determine if the highest-numbered folder can accommodate an additional content file; select a file position number, the selected file position number including the identified highest file position number incremented by one, in response to a determination that the highest-numbered folder can accommodate the additional content file; in response to a determination that the highest-numbered folder cannot accommodate the additional content file: determine that a number of the highest-numbered folder is less than a number of a maximum-numbered folder; select the folder number by incrementing the number of the highest-numbered folder; and select an initial file position number as the selected file position number; in response to a determination that the highest-numbered folder is the maximum-numbered folder: select, based on the received bitmaps, a lower folder number available to each of the master camera and the secondary cameras; and select an initial file position number as the selected file position number; and transmit, to each of the secondary cameras, (i) the selected folder number or the selected lower folder number and (ii) selected file position number.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 illustrates a table of example file synchronization values within a multi-camera system, according to one embodiment.

DETAILED DESCRIPTION

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Environment of a Multi-camera System

Figure 1:
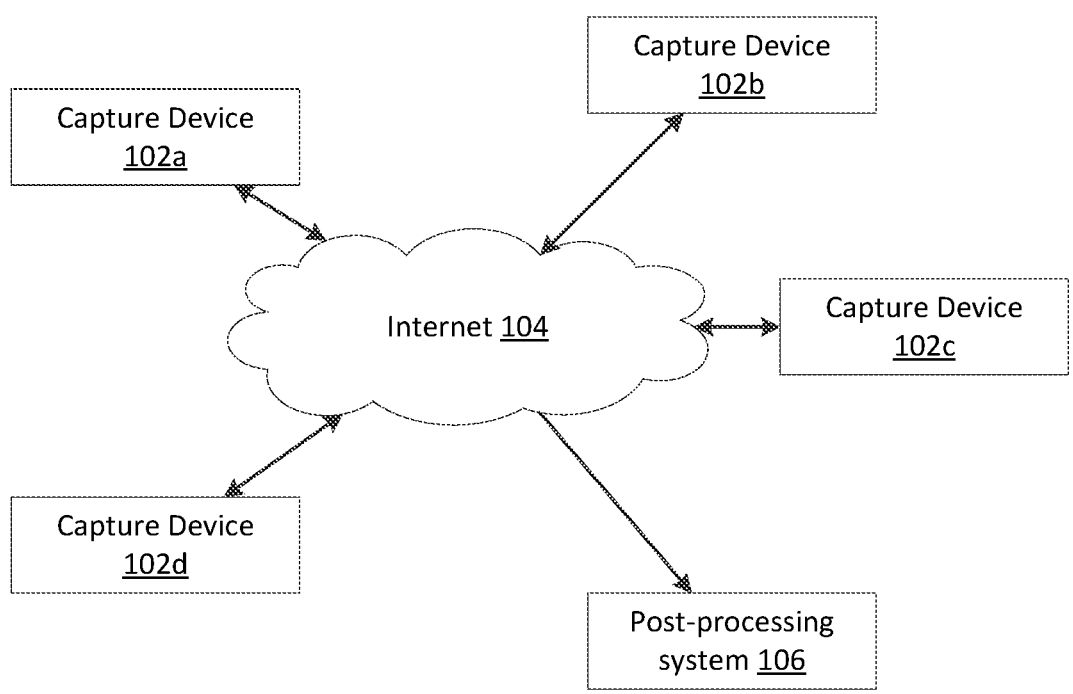
FIG. 1 illustrates a multi-camera system, according to one embodiment.

FIG. 1 illustrates a multi-camera system, according to one embodiment. The environment 100 includes four capture devices 102a, 102b, 102c, and 102d, all communicatively coupled via the internet 104. Capture devices are generally configured to capture one or more kinds of media. Examples of capture devices include smartphones, digital cameras, video cameras, audio recorders, and the like. A post-processing system 106, for instance a capture device, a personal computer system, a mobile device, a media-editing computing system, a cloud server, or the like, is configured to access media content files captured and/or stored by the capture devices 102 via the Internet 104. The post-processing system 106 is also configured to compare, synchronize, assemble, or further process the accessed media content files.

In another embodiment, the capture devices 102 and post-processing system 106 may be configured to communicate with one another via other communication methods or technologies not involving Internet. In one embodiment, the capture devices 102 and post-processing system 106 communicate via Wi-Fi, Bluetooth, and the like. In another embodiment, the capture devices 102 and post-processing system 106 are connected via physical means (such as a cable).

Synchronizing Simultaneous Captures in a Multiple Capture Device System

As described with reference to FIG. 1, multiple capture devices operating as part of a multi-camera system interact to simultaneously capture different views, perspectives, or versions of the same event. For the sake of generality, each media content file—which may include image, audio, and/or video files—is referred to simply as a "capture". Captures are stored independently by each capture device 102 according to its own storage availability. Because capture devices 102 can be configured to operate independently and may have previously captured content independently of each other, media captured simultaneously by the captured devices 102 are often stored by each capture device 102 in a different folder and with a different file number. For post-processing applications in which the captures are synchronized, stitched together, or otherwise combined, the identification and retrieval of each of the component captures can be difficult. It should be noted that as used herein, "simultaneous capture" refers to the capture of media by different capture devices at temporally proximate times.

In one embodiment, file synchronization in a multi-device system as described herein ensures that simultaneous captures are stored in corresponding locations and with corresponding file numbers across each participating capture devices. The capture devices interact to synchronize a folder and file location for each capture. In the embodiments described herein, each of the capture devices in the set of captured devices stores files according to the DCF file naming convention, which specifies for each file a folder number and file number, though in other embodiments, other file naming conventions can be used according to the principles described herein. Therefore, the capture devices in the set of capture devices can save simultaneous captures with a same file number and folder number (and thus, a same file name), making subsequent synchronization more straightforward.

Figure 2A:
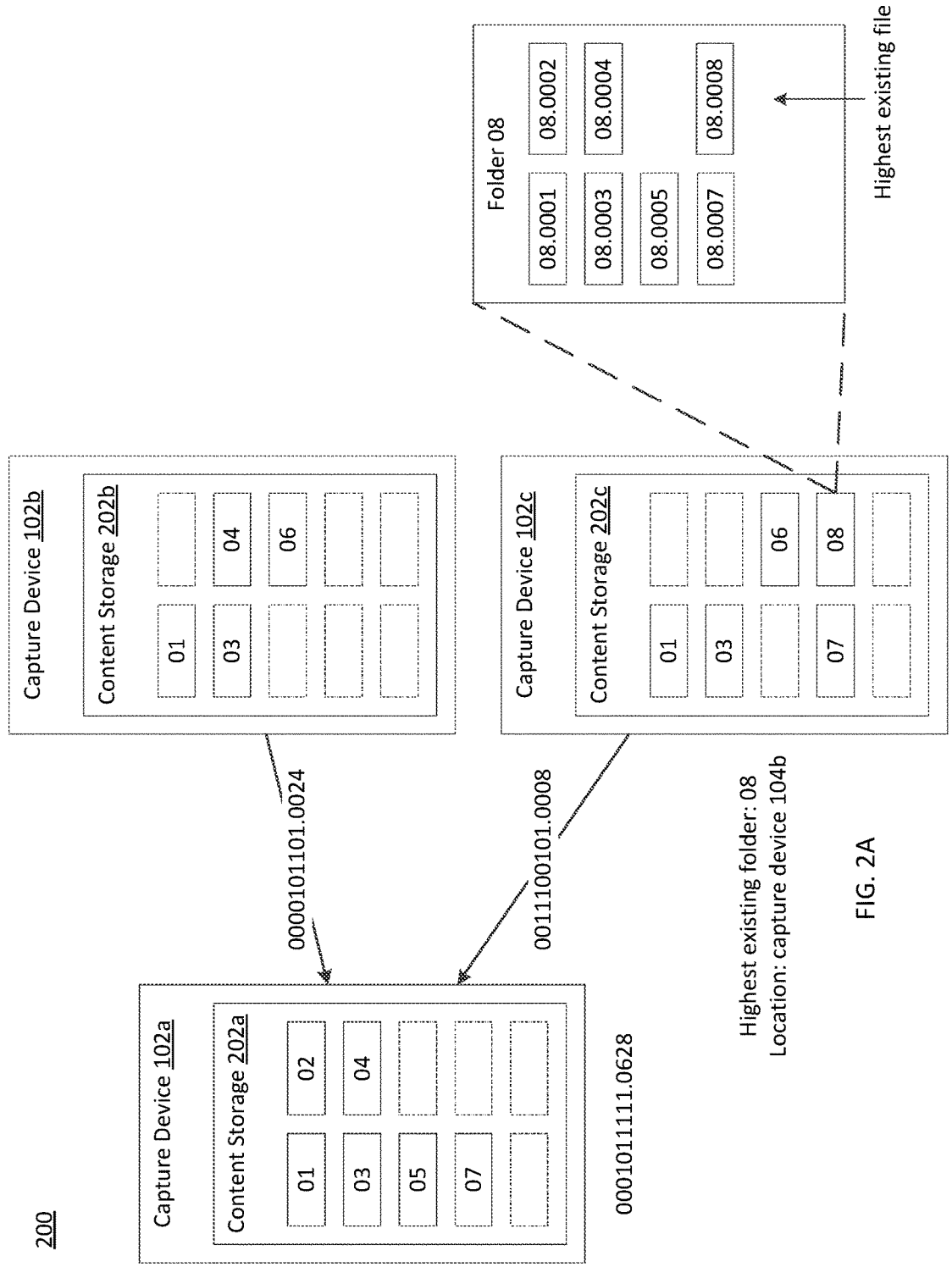
FIGS. 2A and 2B are diagrams illustrating file synchronization in a multi-camera system, according to one embodiment.
Figure 2B:
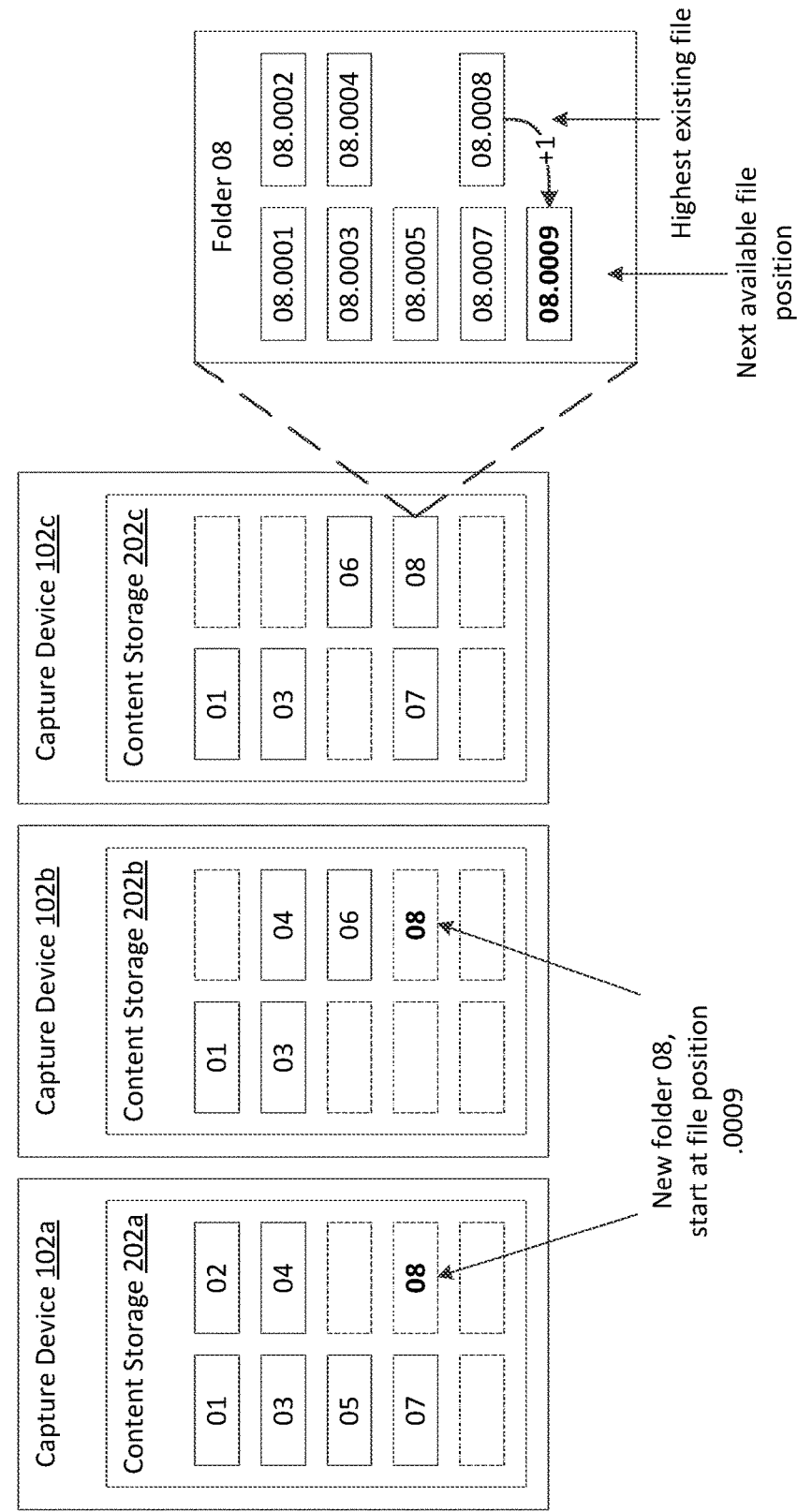

FIGS. 2A and 2B are diagrams illustrating file synchronization in a multi-camera system, according to one embodiment. The environment 200 depicts three capture devices 102a, 102b, and 102c. In the example depicted in FIG. 2A, the capture device 102a is configured to act as a primary capture device; as such, it synchronizes files captured by each capture device in the environment 200. The capture devices 102 include content storages 202a, 202b, and 202c respectively. Some examples of content storages 202 include SD cards, hard drives, or any other non-transitory/non-volatile storage medium. Content storages 202 may or may not be removable from the capture device 102. As will be described in detail later, content storages 202 are configured to store captured media content such as images, audio, and video.

Each content storage 202 is configured to organize content in multiple folders, in accordance with the DCF scheme. Each folder is further configured to store individual captures of various file types. Folders and files are numbered so as to indicate their chronological position relative to other folders and files. Additionally, the content storages 202 may be sparse, meaning that they may be partially filled with folders occupying non-consecutive positions (or "slots"). Individual folders may also be sparse, meaning that they can be partially filled with files occupying non-consecutive positions. As depicted in FIG. 2, content storage 202a contains folders 01, 02, 03, 04, 05, and 07; content storage 202b contains folders 01, 03, 04, and 06; and content storage 202c contains folders 01, 03, 06, and 07.

It should be noted that the concept of "positions" as described with reference to FIG. 2 is merely an abstraction, and individual content storages 202 may or may not actually partition physical memory in the manner described. Partitions should be understood to refer only to logical folder and file numbering; if, for example, a content storage contains folders 05 and 07 but no folder 06, then the $6^{th}$ folder "position" is available, even if folders 05 and 07 occupy adjacent sections of memory. Likewise, if a particular folder contains files 0002 and 0004, then the $3^{rd}$ file "position" is available.

Returning to FIG. 2, in response to a determination for each capture device 102 to simultaneously capture media (for instance, in response to a capture input received by a user) the capture device 102a requests (or accesses) from each of the other capture devices 102b and 102c a bitmap identifying the folder and file utilization of content storages 202b and 202c respectively. In one embodiment, each bitmap contains two components. The first component is a binary string indicating which folders are present or absent within the content storage 202. A "1" indicates the presence of a folder of a given number and a "0" indicates its absence. In other words, the $n^{th}$ bit of the bitmap is 1 if the $n^{th}$ folder exists and 0 if it does not. In one embodiment, bitmaps are read right-to-left with the least significant bit in the rightmost position of the bitmap. The second component is a decimal number indicating the highest occupied file position in the highest-numbered folder of the capture device 102.

For example, the highest-numbered folder in content storage 202c (of secondary capture device 102c) is 08; the highest occupied file position within folder 08 is 0008 (see folder detail). Therefore, secondary capture device 102c transmits the bitmap "0011100101.0008" to the capture device 102a. Likewise, the capture device 102a receives the bitmap "0000101101.0024" from capture device 102b (indicating that the highest occupied file position is "24" in the highest-number folder "6" stored by the storage 202b) and computes the bitmap "0001011111.0628" based on its own content storage 202a (indicating that the highest occupied file position is "628" in the highest-number folder "7" stored by the storage 202a).

The capture device 102a compares the bitmaps to determine the value of the highest-numbered folder across all of the capture devices 102. The capture device 102a determines that the highest-numbered folder is folder 08, contained in storage 202c of the capture device 102c. The capture device 102a further identifies file 0008 as the highest occupied file position with folder 08 of the storage 202c. Referring now to FIG. 2B, the capture device 102a determines that the highest occupied file position is less than a maximum file position available under the DCF scheme, which limits each folder to 10000 individual files. The capture device 102a then selects a file position greater than the 0008 by incrementing the file position 0008, resulting in the file position 0009. The capture device 102a then transmits the determined highest-numbered folder and selected file position to each of the other capture devices 102b and 102c. As a result, upon simultaneously capturing media, the capture devices 102a, 102b, and 102c will all store the simultaneously captured files at file position 0009 within folder 08 of their respective content storages 202. By identifying a highest folder number across the content storages 202 and selecting a file position number greater than the highest file number stored within the highest folder number by the content storages 202, subsequent simultaneously captured media can be stored by each capture device 102 using the same file name (including a same folder number and file position number) without conflicting with existing files stored by the capture device 102.

Figure 3:
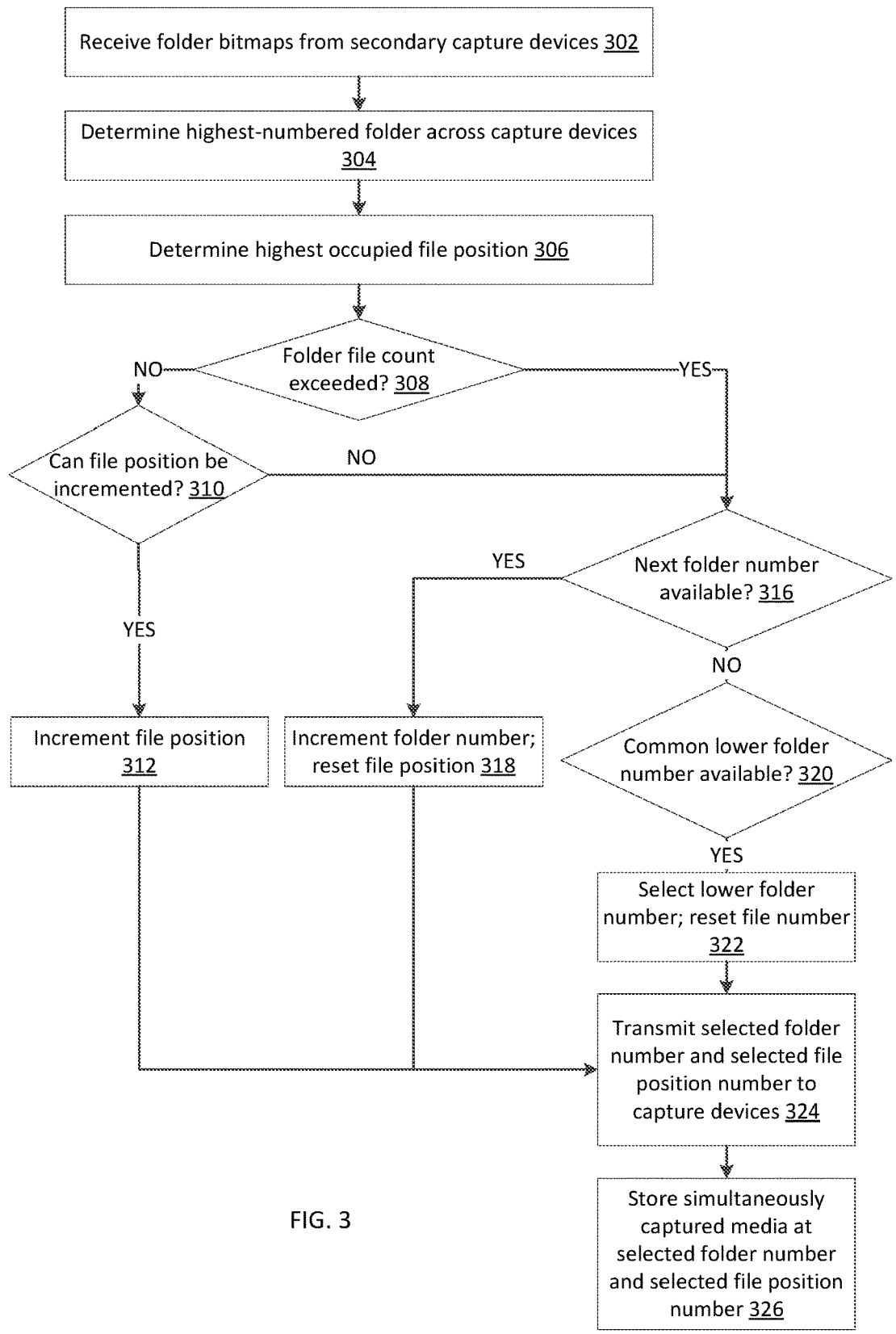
FIG. 3 is a flowchart illustrating a file synchronization process in a multi-camera system, according to one embodiment.

FIG. 3 is a flowchart illustrating a file synchronization process in a multi-camera system, according to one embodiment. A capture device, configured as a primary capture device, receives 302 a folder bitmap from one or more secondary capture devices. The folder bitmaps can be received in response to a request from the primary capture device, which in turn can be in response to a request for simultaneous media capture (for instance, from a user) by a set of capture devices made up of the primary capture device and the one or more secondary capture devices. The primary capture device then determines 204 the highest-numbered storage folder across all of the capture devices. The primary capture device then determines 306 the highest occupied file position within the determined highest-numbered folder.

The primary capture device subsequently determines 308 if the determined highest-numbered folder includes a predetermined maximum number of files. In one embodiment, a file count value may be transmitted by each of the capture devices as part of a folder bitmap. If the folder file count within the determined highest-numbered folder has not been exceeded, the primary capture device determines 310 if the highest occupied file position can be incremented. For example, if the file naming convention is "IMG_XXXX", and if the highest occupied file position is "9999", then the highest occupied file position cannot be incremented without the file position rolling over to "0000". In contrast, if the file naming convention is "IMG_XXXXX", and if the highest occupied file position is "09999", then the highest occupied file position can be incremented to "10000". If the highest occupied file position can be incremented, the primary capture device selects the highest-numbered folder number and selects a file position number by incrementing 312 the highest occupied file position. The primary capture device then transmits 324 the selected highest-numbered folder number and the selected file position number to each of the other capture devices.

If the highest occupied file position cannot be incremented, or if the primary capture device determines that the folder file count within the determined highest-numbered folder has been exceeded, the primary capture device then determines 316 based on the bitmap whether a next folder is available (a folder with a folder number greater than the determined highest-numbered folder). If it is, the primary capture device increments 318 the folder number and resets the file position back to a lowest or starting number (such as "0000" or "0001"). The primary capture device then transmits the incremented folder number and the reset file position number to each of the other participating secondary capture devices as the selected folder number and selected file position number.

If the primary capture device determines that the next folder number is not available, it accesses each of the received folder bitmaps to determine 320 if a common lower-numbered folder is available (not present) in each of the capture devices. If there is, the primary capture device selects 322 the common lower-numbered folder and selects the lowest file position number. In one embodiment, if no common lower-numbered folder is available in each of the capture devices, a lower-numbered folder can be selected by the primary capture device, and a file position number can be selected (for instance, by selecting a highest file position number in the selected lower-numbered folders and incrementing the highest file position number). The primary capture device then transmits the selected folder number and file position number to each of the participating capture devices. The capture devices subsequently simultaneously capture media, and store 326 the captured media at the selected folder number and selected file position number within the corresponding memory of the capture devices.

FIG. 4 illustrates a table of example file synchronization values within a multi-camera system, according to one embodiment. Each row of the table expresses a different example file structure involving a primary capture device 102a and a secondary capture device 102b, responsive to a synchronization action (such as a request for the capture devices 102 to simultaneously capture media). In Example 1, the primary capture device 102a identifies folder 109 as the highest-numbered folder within the content storage 202a of the primary capture device. Within folder 109, the highest occupied file position has a value of 0990, and folder 109 contains 500 files. Likewise, the secondary capture device 102b indicates (for instance, via a bitmap provided to the primary capture device 102a) that its highest-numbered folder also has value of 109. Within folder 109 of the secondary capture device 102b, the highest-numbered file position has a value of 0445, and folder 109 contains 200 files. Therefore, during a synchronization action, primary capture device 102a selects folder number 109 as the highest-numbered folder across the capture devices. Additionally, the highest occupied file position within the selected folder number 109 has a value of 0990, and if the maximum file count for a folder is 9,999, folders 109 of both capture devices 102 have a file count that does not exceed the maximum file count. Therefore, the primary capture device 102 selects a file position number by incrementing the highest occupied file position number from 0990 to 0991. The primary capture device 102a transmits the selected folder number and selected file position number to the secondary capture device 102b. As a result, when the primary capture device 102a and the secondary capture device 102b simultaneously capture content, the resulting content files are stored in both devices in folder 109 at file position 0991.

In Example 2, the primary capture device 102a identifies folder 100 as its highest-numbered folder. Within folder 100, the highest occupied file position has a value of 1000. Folder 100 also contains 100 files. Likewise, the secondary capture device 102b indicates that folder 102 is its highest-numbered folder. Within folder 102, the highest occupied file position has a value of 0002, and it contains 2 files. Therefore, during a synchronization action, primary capture device 102a selects folder 102 as the highest-numbered folder across the capture devices. Additionally, if the maximum file count for a folder is 9,999, folder 102 has a file count that does not exceed the maximum file count. Therefore, the primary capture device 102 transmits the selected folder number and selected file position to the secondary capture device 102b. As a result, when the primary capture device 102a and the secondary capture device 102b simultaneously capture content, the resulting content files are stored in both devices in folder 102 at file position 0003.

In Example 3, the primary capture device 102a identifies folder 102 as its highest-numbered folder. Within folder 102, the highest occupied file position has a value of 9999. Folder 102 also contains 10 files. Likewise, the secondary capture device 102b indicates that folder 102 is its highest-numbered folder. Within folder 102, the highest occupied file position has a value of 0005. Further, folder 102 contains 5 files. Therefore, during a synchronization action, primary capture device 102a identifies folder 102 as the highest-numbered folder across the capture devices. However, if the maximum file count for a folder is 9,999, the primary capture device 102a identifies that the highest occupied file position of 9999 is equal to the maximum file-position value and cannot be incremented. Therefore, the primary capture device 102a increments the highest-numbered folder from 102 to 103. It also resets the file position to a lowest number such as 0000 or 0001. It transmits the selected folder number and selected file position to the secondary capture device 102b. As a result, when the primary capture device 102a and the secondary capture device 102b simultaneously capture content, the resulting content files are stored in both devices in folder 103 at last-file position 0001.

In Example 4, primary capture device 102a identifies folder 100 as its highest-numbered folder. Within folder 100, the highest occupied file position has a value of 0100. Folder 100 also contains 100 files. Likewise, the secondary capture device 102b indicates that folder 999 is its highest-numbered folder. Within folder 999, the highest occupied file position has a value of 9990. Further, folder 999 contains 999 files. In this example, a maximum file count is equal to 999. Therefore, during a synchronization action, primary capture device 102a identifies folder 999 as the highest-numbered folder across the capture devices. However, primary capture device 102a identifies that the file count of folder 999 is equal to the maximum file-count (999) and cannot be incremented. Additionally, the highest-numbered folder 999 is equal to a maximum folder value and also cannot be incremented. Therefore, the primary capture device 102a determines if a lower-numbered folder common to both itself and the secondary capture device 102b is unused. The primary capture device 102a determines that folder 101 on both capture devices is unused, and thus can accommodate subsequently captured media. Therefore, the primary capture device 102a selects folder 101 and resets the file position to a lowest number such as 0000 or 0001. The primary capture device 102a transmits the selected folder number and file position to the secondary capture device 102b. As a result, when the primary capture device 102a and the secondary capture device 102b simultaneously capture content, the resulting content files are stored in both devices in folder 101 at last-file position 0001.

Content Synchronization in a Multiple Capture Device System

As described with reference to FIG. 1, a post-processing system 106 (such as a computing device, a cloud server, or even a capture device 102) can access captures simultaneously captured by multiple capture devices 102, and can synchronize the multiple captures into combined content. As described earlier, a set of simultaneous captures sharing a given folder number and file position number (specified within the file name according to the DCF file-naming convention) is retrieved or accessed. However, because capture devices are not perpetually synchronized and may capture content independently of other capture devices, not all captures accessed from a set of capture devices corresponding to a given folder and file position are in fact simultaneously captured. These captures are considered false positives and can be removed during post-processing.

In one embodiment, false positive (non-simultaneous) captures are identified based on comparison of capture timestamps. For all captures corresponding to a particular folder number and file position number, the post-processing system 106 determines if one or more of the captures are separated by an above-threshold delay based on the respective timestamps of the captures. In one embodiment, an average of the capture timestamps can be determined, and each individual capture timestamp can be compared against the average timestamp. In such embodiments, capture timestamps more than a threshold amount of time away from the average timestamp can be flagged as corresponding to non-simultaneously captured content. The post-processing system 106 may also define a maximum threshold, for instance expressed in terms of standard deviation, beyond which captures are discarded as non-simultaneous. In another embodiment, the timestamp of the capture produced by the primary capture device 102a may be used as a basis for comparison such that timestamps corresponding to captures captured by other capture devices that are more than a threshold amount of time away from the timestamp of the capture of the primary capture device 102 can be flagged as corresponding to non-simultaneously captured content. In some embodiments, before the simultaneous capture of content by a set of capture devices, a primary capture device 102a can provide a time synchronization signal to each secondary capture device, and each secondary capture device can adjust an internal clock based on the time synchronization signal. In such embodiments, content simultaneously captured by the set of capture devices includes synchronized timestamps, aiding in the process of identifying false positive simultaneously captured content in post-processing.

Figure 5:
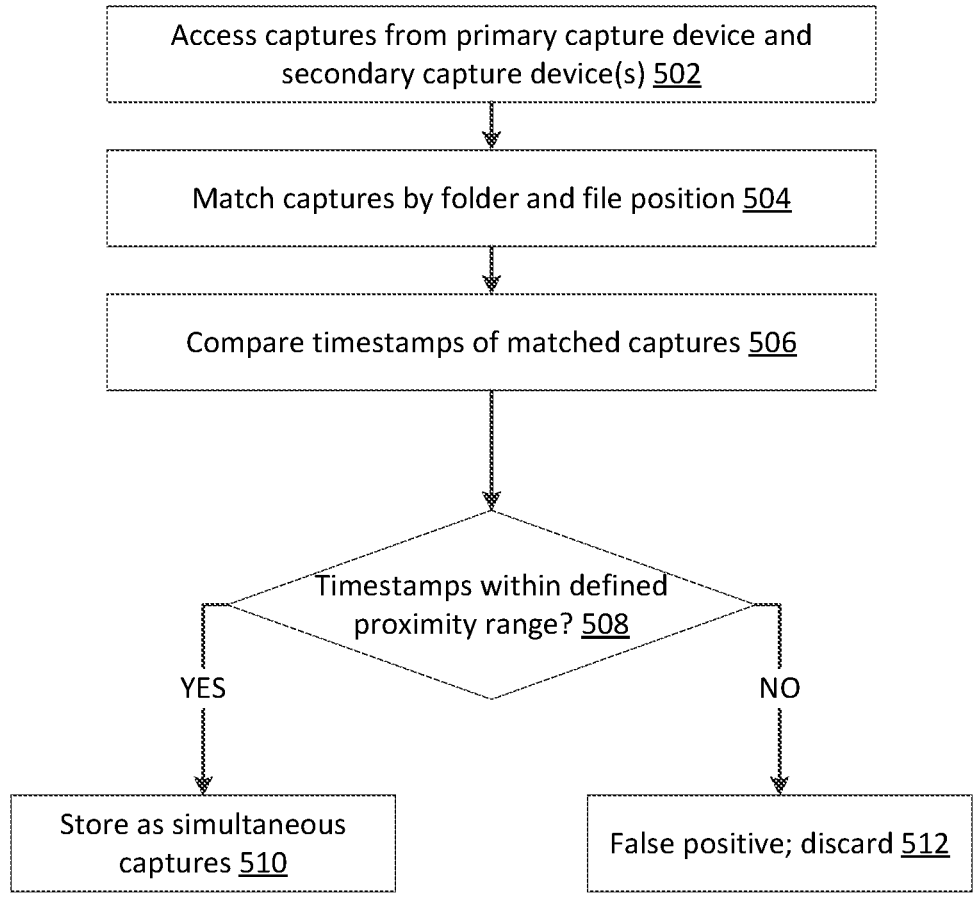
FIG. 5 is a flowchart illustrating a post-processing synchronization process for content captured by a multi-camera system, according to one embodiment.

FIG. 5 is a flowchart illustrating a post-processing synchronization process for content captured by a multi-camera system, according to one embodiment. A post-processing system accesses 502 captures from a primary capture device and one or more secondary capture devices. In another embodiment, the primary capture device accesses captures from the one or more secondary capture devices and provides it to the post-processing system. The post-processing system matches and groups 504 captures based on the respective folder numbers and file position numbers of the captures, thereby producing one or more capture groups. Each capture group contains captures with a same folder number and file position number. Each capture in the capture group is associated with a timestamp indicating when the capture was captured. Within each capture group, the post-processing system compares 506 the timestamps corresponding to the captures within the capture group. The post-processing system then determines 508 if the timestamps fall within a defined proximity range. As previously described, this proximity range may be expressed in terms in absolute or relative terms. If the two or more timestamps are separated by a delay less than or equal a threshold time interval, the system identifies and stores 510 the associated captures as simultaneous. In one embodiment, the system additionally compares a Globally Unique Media Identifier (GUMI) associated with each capture. Comparison of the GUMIs provides certainty that the captures are indeed simultaneous.

Instead, if two timestamps are separated by a delay in excess of the threshold time interval, the system identifies the captures as having been captured non-simultaneously, and discards 512 the corresponding capture group as a false positive.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, and can include one or more hardware processors configured to execute special instructions for performing the functions described herein. Such instructions may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A multi-camera system comprising:
   one or more secondary cameras; and
   a master camera configured to:
   receive, from each of the one or more secondary cameras, a bitmap describing a file and folder structure of the respective secondary camera;
   select a folder number based on a highest-numbered folder identified by the received bitmaps;
   identify a highest file position number within the highest-numbered folder using the received bitmaps;
   determine if the highest-numbered folder can accommodate an additional content file;
   select a file position number, the selected file position number comprising the identified highest file position number incremented by one, in response to a determination that the highest-numbered folder can accommodate the additional content file;
   in response to a determination that the highest-numbered folder cannot accommodate the additional content file:
      determine that a number of the highest-numbered folder is less than a number of a maximum-numbered folder;
      select the folder number by incrementing the number of the highest-numbered folder; and
      select an initial file position number as the selected file position number;
   in response to a determination that the highest-numbered folder is the maximum-numbered folder:
      select, based on the received bitmaps, a lower folder number available to each of the master camera and the secondary cameras; and
      select the initial file position number as the selected file position number; and
   transmit, to each of the secondary cameras, (i) the selected folder number or the selected lower folder number and (ii) the selected file position number.

2. The multi-camera system of claim 1, wherein a folder corresponding to the selected folder number or the lower folder number exists on at least one of the master camera and the secondary cameras, and wherein the selected initial file position number comprises a file position number greater than a largest file position number corresponding to an existing folder corresponding to the selected folder number.

3. The system of claim 1, wherein the determination that the highest-numbered folder can accommodate the additional content file further comprises:
   determination that the highest file position number within the highest-numbered folder is less than a maximum file position number; and
   determination that a total file count within the highest-numbered folder is less than a maximum file count.

4. The system of claim 1, wherein the master camera and the secondary cameras are configured to simultaneously capture media content and to store the simultaneously captured media content in the selected folder number and at the selected file position number.

5. The system of claim 1, wherein:
   the master camera and the one or more secondary cameras are each configured to simultaneously capture different views of an environment; and
   the master camera and the one or more secondary cameras are communicatively coupled via a network.

6. The system of claim 1, wherein the master camera is further configured to synchronize data captured by each of the master camera and the one or more secondary cameras.

7. A method for content synchronization in a multi-camera system comprising:
   receiving, by a master camera from each of a plurality of secondary cameras, a bitmap describing a file and folder structure of the respective secondary camera;
   selecting, by the master camera, a folder number based on a highest-numbered folder identified by the received bitmaps;
   identifying, by the master camera, a highest file position number within the highest-numbered folder using the received bitmaps;
   determining, by the master camera, if the highest-numbered folder can accommodate an additional content file;
   selecting, by the master camera, a file position number, the selected file position number comprising the identified highest file position number incremented by one, in response to a determination that the highest-numbered folder can accommodate the additional content file;
   in response to a determination that the highest-numbered folder cannot accommodate the additional content file:
      determining, by the master camera, that a number of the highest-numbered folder is less than a number of a maximum-numbered folder;
      selecting, by the master camera, the folder number by incrementing the number of the highest-numbered folder; and
      selecting, by the master camera, an initial file position number as the selected file position number;
   in response to a determination that the highest-numbered folder is the maximum-numbered folder:
      selecting, by the master camera and based on the received bitmaps, a lower folder number available to each of the master camera and the secondary cameras; and
      selecting, by the master camera, an initial file position number as the selected file position number; and
   transmitting, by the master camera to each of the secondary cameras, (i) the selected folder number or the selected lower folder number and (ii) the selected file position number.

8. The method of claim 7, wherein a folder corresponding to the selected folder number or the lower folder number exists on at least one of the master camera and the secondary cameras, and wherein the selected initial file position number comprises a file position number greater than a largest file position number corresponding to an existing folder corresponding to the selected folder number.

9. The method of claim 7, wherein the determining that the highest-numbered folder can accommodate the additional content file further comprises:
    determining, by the master camera, that the highest file position number within the highest-numbered folder is less than a maximum file position number; and
    determining, by the master camera, that a total file count within the highest-numbered folder is less than a maximum file count.

10. The method of claim 7, wherein each camera of the master camera and the secondary cameras are configured to simultaneously capture media content and to store the simultaneously captured media content in the selected folder number and at the selected file position number.

11. The method of claim 7, further comprising capturing, by the master camera, media data simultaneously with the plurality of secondary cameras.

12. The method of claim 11, further comprising:
    storing, by the master camera, the captured media data at the selected folder number or the selected lower folder number; and
    enabling each of the plurality of secondary cameras to store the captured media data at the selected folder number or the selected lower folder number.

13. A computer-readable apparatus comprising a storage medium storing executable instructions for content synchronization in a multi-camera system, the instructions, when executed by a hardware processor apparatus, configured to cause a master camera to:
    receive, from each of a plurality of secondary cameras, a bitmap describing a file and folder structure of the respective secondary camera;
    select a folder number based on a highest-numbered folder identified by the received bitmaps;
    identify a highest file position number within the highest-numbered folder using the received bitmaps;
    determine if the highest-numbered folder can accommodate an additional content file;
    select a file position number, the selected file position number comprising the identified highest file position number incremented by one, in response to a determination that the highest-numbered folder can accommodate the additional content file;
    in response to a determination that the highest-numbered folder cannot accommodate the additional content file:
        determine that a number of the highest-numbered folder is less than a number of a maximum-numbered folder;
        select the folder number by incrementing the number of the highest-numbered folder; and
        select an initial file position number as the selected file position number;
    in response to a determination that the highest-numbered folder is the maximum-numbered folder:
        select, based on the received bitmaps, a lower folder number available to each of the master camera and the secondary cameras; and
        select an initial file position number as the selected file position number; and
    transmit, to each of the secondary cameras, (i) the selected folder number or the selected lower folder number and (ii) selected file position number.

14. The computer-readable storage medium of claim 13, wherein a folder corresponding to the selected folder number or the lower folder number exists on at least one of the master camera and the secondary cameras, and wherein a selected initial file position number comprises a file position number greater than an largest file position number corresponding to the existing folder corresponding to the selected folder number.

15. The computer-readable storage medium of claim 13, wherein the determination that the highest-numbered folder can accommodate the additional content file further comprises:
    determination, by the master camera, that the highest file position number within the highest-numbered folder is less than a maximum file position number; and
    determination, by the master camera, that a total file count within the highest-numbered folder is less than a maximum file count.

16. The computer-readable storage medium of claim 13, wherein each of the master camera and the secondary cameras are configured to simultaneously capture media content and to store the simultaneously captured media content in the selected folder number and at the selected file position number.

17. The computer-readable storage medium of claim 13, wherein the instructions, when executed by a hardware processor apparatus, are further configured to cause a master camera to establish data connection with one or more of the plurality of secondary cameras via a data network.

18. The computer-readable storage medium of claim 13, wherein the instructions, when executed by a hardware processor apparatus, are further configured to cause a master camera to request for simultaneous media capture by the master camera and the plurality of secondary cameras;
    wherein the receipt, from each of the plurality of secondary cameras, of the bitmap describing the file and folder structure of the respective secondary camera is in response to the request.

19. The computer-readable storage medium of claim 13, wherein the instructions, when executed by a hardware processor apparatus, are further configured to cause a master camera to capture media data simultaneously with the plurality of secondary cameras.

* * * * *